C. A. TANNER & A. P. SAXER.
GAGE COCK.
APPLICATION FILED DEC. 12, 1910.
1,011,093.
Patented Dec. 5, 1911.
2 SHEETS—SHEET 2.
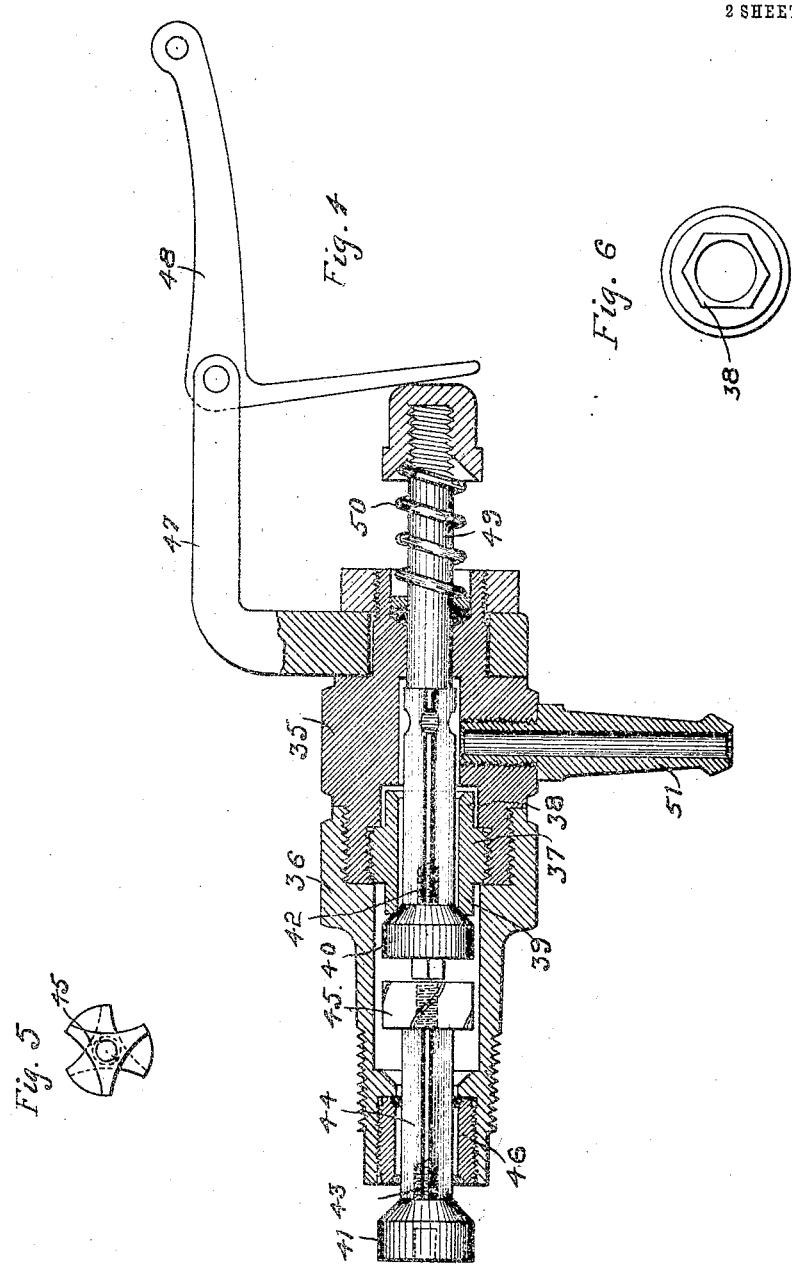
WITNESSES
INVENTORS
Charles A. Tanner
Albert P. Saxer
by atty
Paul Synnestvedt

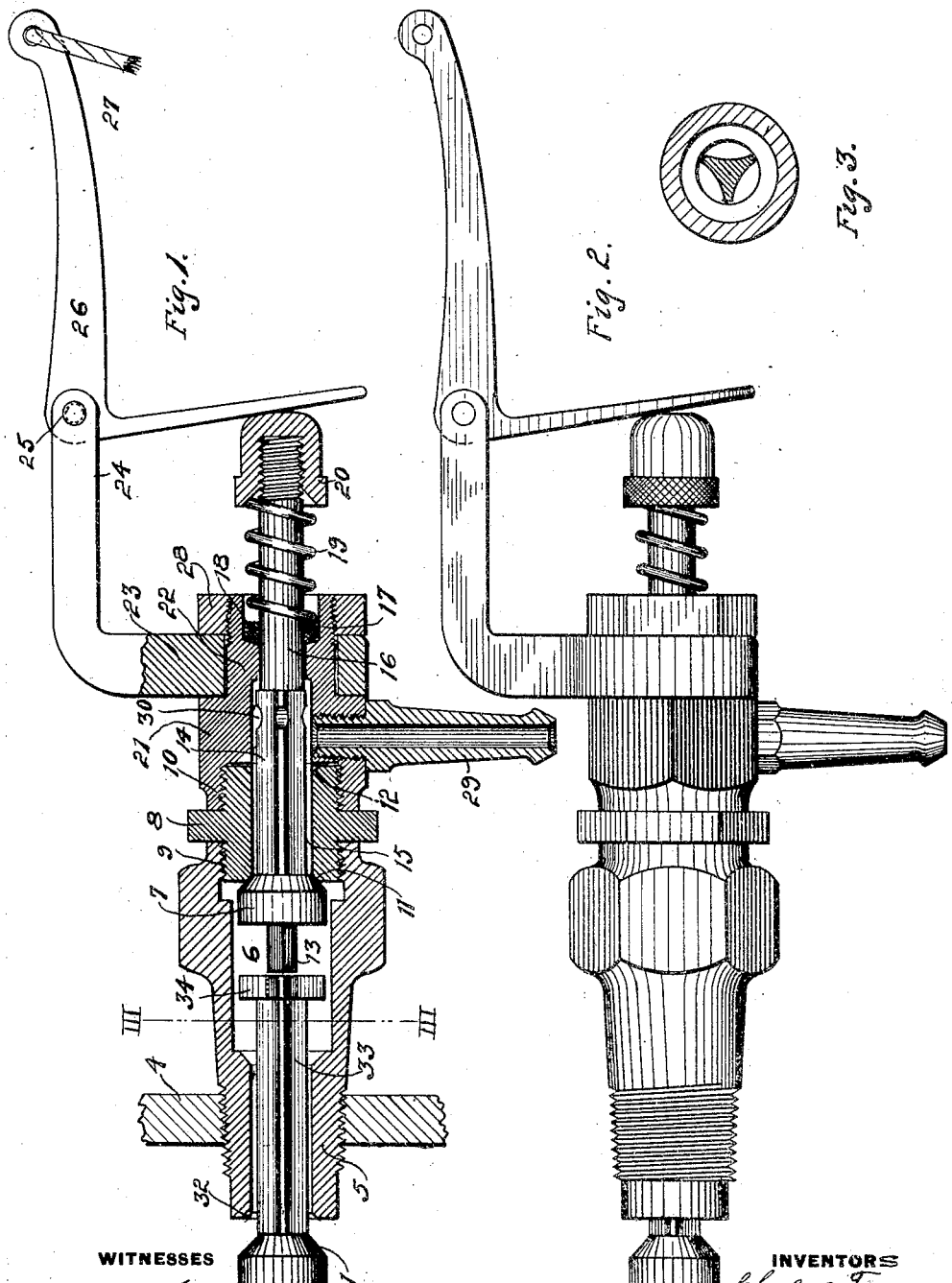

UNITED STATES PATENT OFFICE.

CHARLES A. TANNER AND ALBERT P. SAXER, OF PITTSBURGH, PENNSYLVANIA.

GAGE-COCK.

1,011,093.

Specification of Letters Patent.   Patented Dec. 5, 1911.

Application filed December 12, 1910.   Serial No. 596,788.

*To all whom it may concern:*

Be it known that we, CHARLES A. TANNER and ALBERT P. SAXER, both residing at Pittsburgh, in the county of Allegheny and State of Pennsylvania, have invented certain new and useful Improvements in Gage-Cocks, of which the following is a specification.

This invention has reference to an improved construction of gage cock for boilers, designed to improve the effectiveness thereof, to facilitate repair, to simplify and render more durable the construction of certain of the parts, and to construct the device as a whole such as will make it possible to conveniently attach the operating cord or device employed for manipulating the cock so that it can readily be reached from any predetermined desired position.

The above as well as such other objects as may hereinafter appear, we attain by means of a construction which we have illustrated in preferred form in the accompanying drawings, wherein:—

Figure 1 is a vertical sectional view indicating our improvement. Fig. 2 is an outside elevation of the device. Fig. 3 is a sectional view taken on the line III—III of Fig. 1. Fig. 4 is a vertical sectional view taken through a modified form of valve construction. Fig. 5 is an end view of the retaining means on the supplemental valve stem, and Fig. 6 is an end view of the feed nut employed.

In order to more clearly illustrate our mechanism, we have shown in Fig. 1 a sectional view indicating the gage cock as placed in position in a boiler, a portion of the wall whereof is shown in section at 4. Into this boiler-wall is screwed the body portion 5, which at its outer end contains the chamber 6 closed by a valve 7 arranged to seat against a seat bushing 8, which has two threads 9 and 10, and two seats 11 and 12, so disposed that the seat bushing 8 can be reversed to present a new seat for engagement with the valve 7 when occasion requires it. The valve 7, which we shall hereinafter term the main valve, is provided with a head stem 13 which may be square or of other regular shape to facilitate the rotation of the valve in grinding or repairing the seat, and has an oppositely disposed stem 14 preferably triangular extending through the passage-way 15, and continued at its end by the round portion 16, which projects through the packing 17 held by the washer and spring 19 through the tension transmitted by the stem and nut 20.

The packing 17 is held in a recess or box in the end of a casing member 21 which latter is threaded on to the seat member 8, in the manner shown, and is provided with the round bearing 22 surrounded by the collar portion 23 of a supporting bracket 24, which latter carries by pivotal support 25 the bell-crank lever 26, one end whereof bears against the nut 20 and the other end whereof is arranged preferably for the reception of a cord as indicated at 27.

The collar portion 23 of the bracket 24 is held in place by means of the nut 28 engaging a threaded extension of the part 22, so that if it be desired to change the direction or location of the bracket 24 and lever 26 this can be accomplished by simply loosening the nut 28 and swinging around the bracket to the desired position, such as will secure as nearly as possible a straight pull on the lever 26 by the cord 27.

The member 21 is provided with an outlet nozzle 29, and within the chamber inside the casing or member 21 the stem 14 is provided with recessed portions 30 to allow free discharge through the outlet when the valve 7 is held open by the lever 26 and stem 16.

At the extreme inner end of the body portion 5 of the device there is a supplemental valve 31 arranged to seat at 32 when the position of the parts is such as will permit such seating action, as for example, when the seat nut 8 is unscrewed to repair the seat under the main valve 7. The stem 13 is made of such length as will abut against the stem 33 of the supplemental valve 31 and cause full opening of the latter when the main valve 7 is fully opened, and in order to prevent the valve 31 from being displaced, the right hand end of its stem is provided with the threaded nut 34 preferably triangular so as to interfere as little as necessary with the proper flow of the water.

From the above description of the structure the operation of our apparatus should be readily apparent. It is evident that if the cord 27 be pulled this will move the bell-crank lever 26, pushing inward on the stem 16 against the resistance of spring 19 and unseating the main valve 7, this at the same time through the stem 13 pushing the supplemental valve 31 farther from its seat, and allowing free passage-way of the water or steam, as the case may be, out through the nozzle 29 of the gage cock. On releasing the cord the spring 19 assisted by the pressure inside the boiler will force the parts back so as to seat the valve 7. If it be desired to repair the parts the seat nut 8 can be removed without difficulty because the removal thereof permits the supplemental valve 31 to come tightly to its seat and prevents the escape of pressure while the other parts are being altered or put in shape for replacement. The provision of the double end upon the seat nut 8 with the threads 9 and 10 alike permits the said seat nut 8 to be reversed in position bringing the other seat 12 into play where the seat 11 may be cut or leaking, and thus a repair of this character may be made without stopping to grind in the valve.

In Figs. 4, 5 and 6 a modified form of construction is shown, the principal differences of this construction over the one previously described being in the arrangement of the seat nut for the main valve, the provision of a removal seat for the supplemental valve, the provision of a modified form of retaining means upon the stem of the supplemental valve, and the provision of removal valves upon the stems of the main valve and the supplemental valve. In this construction the casing member 35 is screwed directly to the body portion 36, and the seat nut 37 is located inside the casing member. This seat nut is provided with angular end portions 38 and 39 (Fig. 6) whereby the nut may be engaged by a wrench and is provided with the double seat the same as in the other form of device. The main and supplemental valves 40 and 41 are not integral with their respective stems as shown in the other form of construction, but are secured to their stems by means of the threaded studs 42 and 43, so that these valves may be readily removed for regrinding or replacement. The stem 44 of the supplemental valve is also provided with a modified retaining means 45, which consists of spiral wings (Fig. 5), which wings serve to twist the valve stem when water or steam passes through the casing, thus causing the valve 41 to present a different seating surface each time the apparatus is operated, thus reducing the wear and giving a better fit at the seat. The seat nut 46 is also made removable and reversible, and is provided with two seats, so that when one seat is worn or corroded, the other seat may be readily brought into position for use. The valve is provided with a bracket 47, an operating lever 48, a stem 49, a spring 50, and an outlet nozzle 51 similar to the corresponding parts in the structure of Figs. 1, 2 and 3. The structure of Figs. 4, 5 and 6 is somewhat more compact than that of Figs. 1, 2 and 3, and the provision of the removable valves 40 and 41 and the reversible seat nut 46 are regarded by us as improvements over the corresponding construction as shown in Figs. 1, 2 and 3.

Having thus described our invention and illustrated its use, what we claim as new and desire to secure by Letters Patent is the following:

1. A gage cock comprising a pair of opposing casing members interiorly threaded at the opposing ends, the outer one of which casing members is provided with a discharge nozzle, a coupling consisting of a middle wrench engaging flange and reduced ends having screw engagement with the threaded ends of the casing members, a seat upon the end of the coupling, a valve for engaging said seat and having its end extending through the coupling and through the outer casing member, a spring holding the said valve normally closed, a supplemental valve seated in the other casing member, and normally held open by the said valve, and means whereby such other casing member is mounted in position.

2. A gage cock comprising an outer casing member provided with a seat member, and with a nozzle on the outer side of said seat member, a main valve slidable freely through said casing member, a spring for normally moving the valve outwardly so that it engages the seat member, an inner casing member provided with a seat at its inner end, screw means connecting the said outer and inner casing members, a supplemental valve freely slidable longitudinally with respect to the casing members and adapted to engage the said seat at the inner end of the inner casing member, and means movable longitudinally with the main valve whereby the supplemental valve is held open when the two casing members are in assembled position but permitting the closing of the supplemental valve when the casing members are separated.

In testimony whereof we have hereunto signed our names in the presence of the two subscribed witnesses.

CHARLES A. TANNER.
ALBERT P. SAXER.

Witnesses:
 DOERING BELLINGER,
 JULIAN H. KENNEY.